(12) United States Patent
Wu

(10) Patent No.: US 8,330,439 B2
(45) Date of Patent: Dec. 11, 2012

(54) SYSTEM AND METHOD FOR PFM/PWM MODE TRANSITION WITHIN A MULTI-PHASE BUCK CONVERTER

(75) Inventor: Xuelin Wu, Dallas, TX (US)

(73) Assignee: Intersil Americas Inc., Milpitas, CA (US)

( * ) Notice: Subject to any disclaimer, the term of this patent is extended or adjusted under 35 U.S.C. 154(b) by 559 days.

(21) Appl. No.: 12/603,218

(22) Filed: Oct. 21, 2009

(65) Prior Publication Data
US 2010/0320983 A1 Dec. 23, 2010

Related U.S. Application Data

(60) Provisional application No. 61/219,569, filed on Jun. 23, 2009.

(51) Int. Cl.
*G05F 1/59* (2006.01)

(52) U.S. Cl. ......... 323/272; 323/283; 323/284; 323/285

(58) Field of Classification Search ................ 323/272, 323/283, 284, 285
See application file for complete search history.

(56) References Cited

U.S. PATENT DOCUMENTS

| | | | |
|---|---|---|---|
| 5,481,178 A | 1/1996 | Wilcox et al. | |
| 5,568,044 A | 10/1996 | Bittner | |
| RE37,609 E * | 3/2002 | Bittner | ............................ 323/272 |
| 6,580,258 B2 | 6/2003 | Wilcox et al. | |
| 7,116,089 B1 | 10/2006 | Nguyen et al. | |
| 7,173,403 B1 | 2/2007 | Chen et al. | |
| 7,173,404 B2 | 2/2007 | Wu | |
| 7,439,720 B2 | 10/2008 | Nguyen et al. | |
| 7,446,621 B2 | 11/2008 | Chen et al. | |
| 7,504,812 B2 * | 3/2009 | Riehl | ............................ 323/283 |
| 2008/0129259 A1 * | 6/2008 | Endo et al. | ...................... 323/271 |
| 2008/0136383 A1 | 6/2008 | Hasegawa et al. | |
| 2008/0218284 A1 | 9/2008 | Chen et al. | |
| 2010/0320983 A1 * | 12/2010 | Wu | ................................ 323/283 |
| 2012/0044014 A1 * | 2/2012 | Stratakos et al. | ............. 327/530 |

* cited by examiner

*Primary Examiner* — Jeffrey Sterrett
(74) *Attorney, Agent, or Firm* — Howison & Arnott, L.L.P.

(57) ABSTRACT

A multi-phase voltage regulator comprises a plurality of DC/DC voltage regulators. Each of the DC/DC voltage regulators is associated with a particular phase of the multi-phase regulator. Each of the regulators comprises a first switching transistor connected between an input voltage node and a phase node responsive to switching control signals. A second switching transistor is connected between the phase node and a ground node and is responsive to the switching control signals. An inductor is connected between the phase node and an output voltage node. Control logic generates the switching control signals responsive to a pulse control signal. PFM/PWM transition logic generates the pulse control signal. The pulse control signal transitions between a PWM signal and a PFM signal responsive to an error voltage, a feedback voltage from the output voltage node and an inductor current through the inductor. An error amplifier generates the error voltage responsive to the feedback voltage and a reference voltage. The output of each error amplifier in each of the plurality of phases are connected to each other. A capacitor is connected between the output voltage node and a ground node.

19 Claims, 4 Drawing Sheets

US 8,330,439 B2

SYSTEM AND METHOD FOR PFM/PWM MODE TRANSITION WITHIN A MULTI-PHASE BUCK CONVERTER

CROSS-REFERENCE TO RELATED APPLICATIONS

This application claims priority from U.S. Provisional Patent Application No. 61/219,569, filed Jun. 23, 2009, entitled SCHEME OF PFM, PWM MODE TRANSITION IN MULTI-PHASE BUCK CONVERTER, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
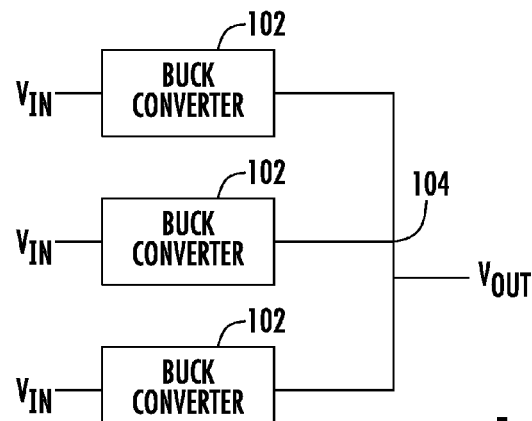
FIG. 1 is a block diagram of a multi-phase buck converter.

Referring now to the drawings, wherein like reference numbers are used herein to designate like elements throughout, the various views and embodiments of a system and method for PFM/PWM mode transition within a multi-phase buck converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

DC/DC voltage converters provide regulated DC output voltages responsive to a provided DC input voltage. DC/DC converters may comprise both single phase and multi-phase voltage converters. Most multi-phase DC/DC voltage converters operate in a pulse width modulation (PWM) mode of operation. However, in light load conditions, the PWM mode of operation provides low system efficiencies due to switching losses and conduction losses in each cycle. Introducing a pulse frequency modulation (PFM) mode of operation to a DC/DC multi-phase current sharing converter enables improvement in the efficiency of operation of the system and reduce power losses. The pulse frequency modulation mode of operation in a DC/DC converter provides a number of advantages with respect to power losses when loading conditions are light. A DC/DC converter operating in a PFM mode of operation will have significantly less power losses than a DC/DC converter operating in a PWM mode of operation within a light load condition. Converters running in a PFM mode of operation only turn on the switching power transistors when they are needed, e.g., when the output voltage drops to a certain level. While the technique of switching between PFM and PWM modes of operation are widely used within single channel DC/DC converters, the technique has not been implemented within multi-phase DC/DC converters.

Referring now to the drawings, and more particularly to FIG. 1, there is illustrated a block diagram of a multi-phase DC/DC converter. In a multi-phase DC/DC converter, an input voltage $V_{IN}$ is applied to the input of a plurality of buck converters 102. Each buck converter 102 is associated with a different phase of the provided input voltage. The outputs of each of the buck converters 102 are tied together at a single node 104 to provide a single output voltage $V_{OUT}$. Each of the buck converters 102 are placed in parallel between the input and the load. Each of the phases is turned on at equally spaced intervals over a switching period. The primary advantage of a multi-phase converter is that the load current is split among the end phases of the multi-phase converter. This load splitting allows the heat losses on the switching transistors associated with each of the buck converters 102 to be spread across a larger area. Another equally important advantage provided by the multi-phase converter is the division of the output ripple by the number of phases. Thus, the multi-phase configuration enables the load to experience a ripple frequency which is N×the switching frequency.

Figure 2:
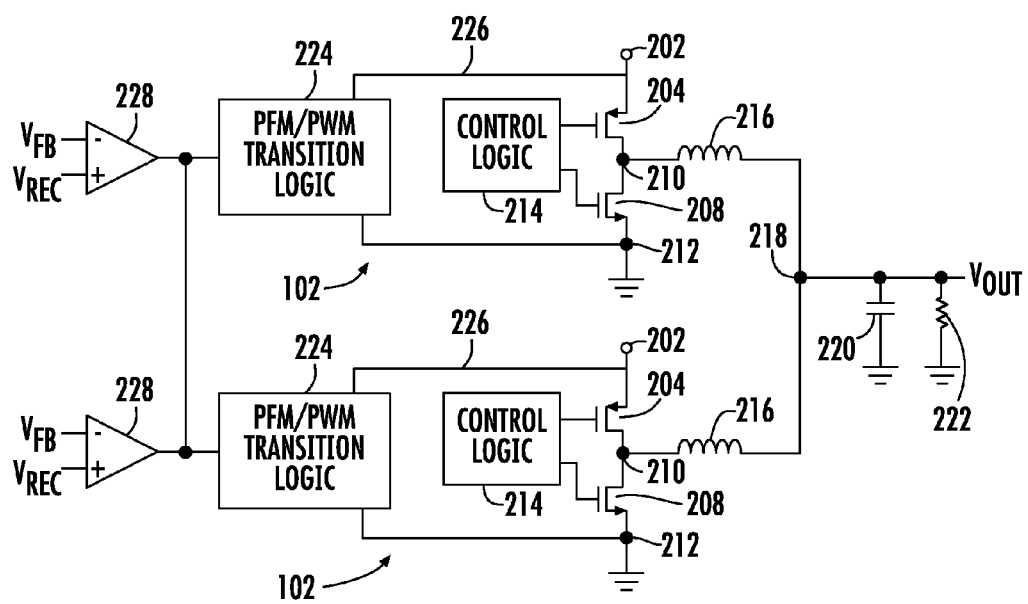
FIG. 2 is a block diagram illustrating a multi-phase buck converter including PFM/PWM transition logic.

Referring now to FIG. 2, there is more particularly illustrated the configuration of the multi-phase buck converter including PFM/PWM transition logic. The input voltage $V_{IN}$ is applied to each of the buck converters 102 at an input node 202. The input voltage is applied across a pair of switching transistors 204 and 208. Transistor 204 comprises a P-channel transistor that has its drain/source path connected between node 202 and a phase node 210. Transistor 208 comprises an N-channel transistor having its drain/source path connected between the phase node 210 and a ground node 212. Each of the transistors 204 and 208 have their gates connected to receive a pulse control signal from control logic 214. Connected to the phase node 210 is an inductor 216 connected between node 210 and the output voltage node 218. The output of each of the buck converters 102 are connected to the output voltage node 218. A capacitor 220 is connected between node 218 and ground and the output load 222 is also connected between node 218 and ground.

The control logic 214 provides a switching control signal to the gate of switching transistors 204 and 208 responsive to an input signal received from PFM/PWM transition logic 224. The PFM/PWM transition logic 224 receives a number of inputs to determine whether to transition the control logic 214 between PFM and PWM modes of operation. The PFM/PWM transition logic 224 monitors the inductor current at node 202 via line 226. Additionally, the PFM/PWM transition logic 224 monitors the zero inductor current crossings through node 212. Finally, the PFM/PWM transition logic 224 is connected to receive an input from the error amplifier 228. Separate PFM/PWM transition logic 224 and error amplifiers 228 are used because the phases are not necessarily in one chip and can be in different units and the only connections between them are the softstart and the outputs of the error amplifiers. The error amplifier 228 has its non-inverting input connected to receive a reference voltage $V_{REF}$ and its inverting input is connected to a feedback voltage $V_{FB}$ from the output voltage node 218. The error amplifier 228 generates an error voltage representing the difference between $V_{FB}$ and $V_{REF}$.

Figure 3:
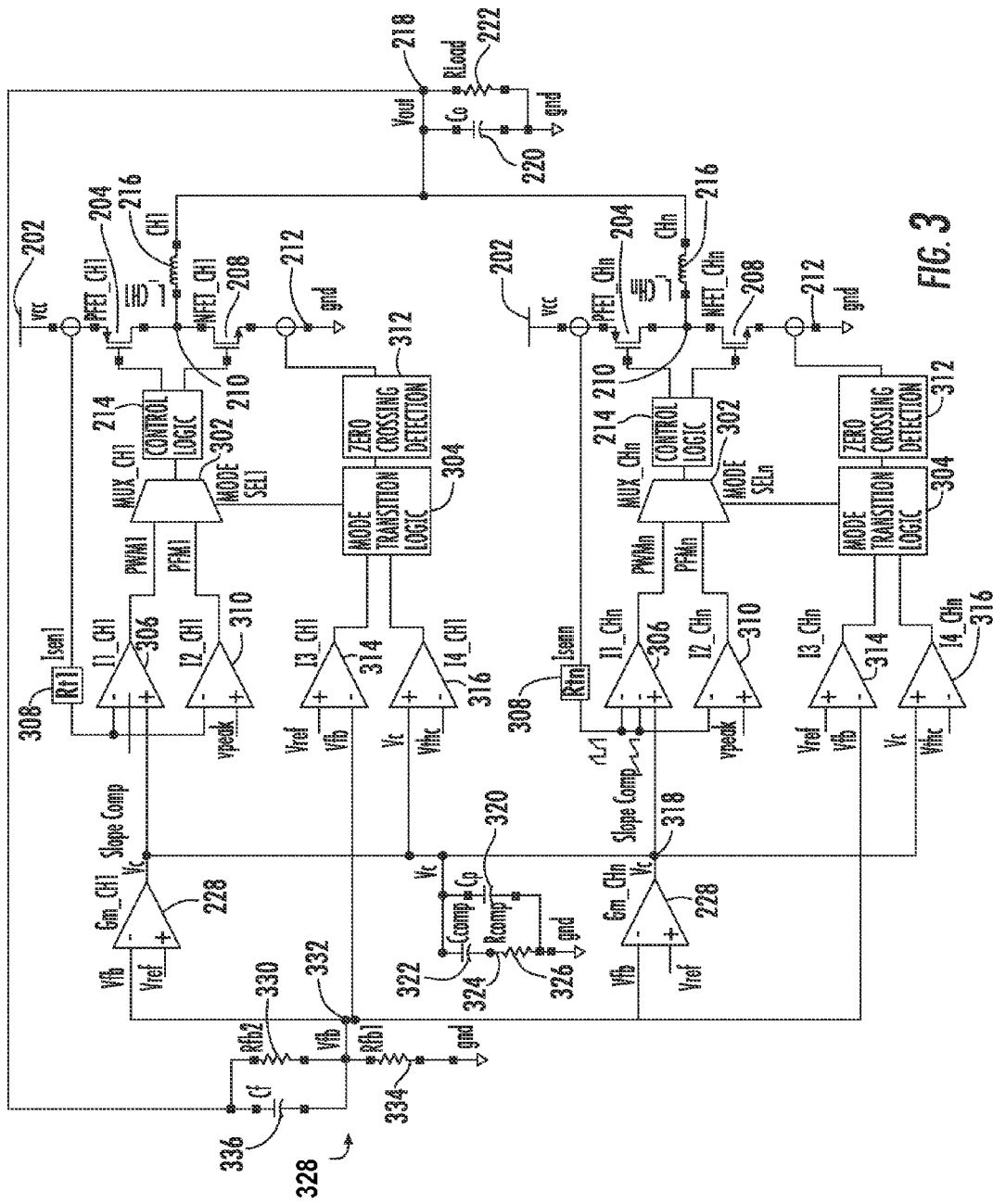
FIG. 3 is a schematic block diagram providing a more detailed illustration of a multi-phase buck regulator including the ability to transition between PFM and PWM modes of operation.

Referring now to FIG. 3, there is illustrated a more detailed block diagram of the multi-phase buck converter and the PFM/PWM transition logic 224 associated therewith. As described previously, the input voltage is provided at an input voltage node 202 across upper and lower switching transistors 204 and 208. Switching transistor 204 comprises a P-channel transistor (an N-channel transistor could also be used in an alternative embodiment) having its source/drain path connected between node 202 and phase node 210. The second switching transistor 208 comprises an N-channel transistor having its drain/source path connected between the phase node 210 and ground node 212. An inductor 216 is connected between the phase node 210 and the output voltage node 218. Connected between the output voltage node 218 and ground in parallel are a capacitor 220 and the output load 222.

The switching transistors 204 and 208 receive their switching control signals from the control logic 214. The control logic 214 generates the control signals to the upper switching transistor 204 and lower switching transistor 208 responsive to either a PWM signal or a PFM signal received from the output of a multiplexer 302. The multiplexer 302 selects between a provided PWM signal and PFM signal responsive to a mode select control signal received from mode transition logic 304.

The PWM signal is provided to the multiplexer 302 from a PWM comparator 306. The PWM comparator 306 is connected to receive the error voltage $V_C$ at a non-inverting input from the output of the error amplifier 228. The PWM comparator 306 additionally receives a slope compensation signal at an inverting input and is connected to monitor the inductor current at node 202 another inverting input through a current sensor 308. The PWM comparator 306 compares the sum of the inductor current with the compensation voltage from the error voltage.

The pulse frequency modulation (PFM) signal is provided to the input of the multiplexer 302 from a PFM comparator 310. The PFM comparator 310 limits the peak current in the PFM mode of operation to prevent too much energy from pumping into the load 222 and to restrict the output ripple from the associated phase. The PFM comparator 310 compares the inductor current at node 202 with a peak voltage VPEAK. The sensed current is provided at the inverting node of comparator 310 and the VPEAK voltage is provided at the non-inverting input of comparator 310.

The selection of either the PWM or PFM signal by the multiplexer 302 is controlled by the mode transition logic 304. The mode transition logic 304 determines the transitions from PFM mode to PWM mode and from PWM mode to PFM mode of operation based upon a number of differing inputs. The zero crossing detection logic 312 determines the number of zero current crossings within the inductor 216 by monitoring the current through the ground node 212. Whenever a zero current crossing is detected within the inductor 216, an indication of this is provided to the mode transition logic 304 by the zero crossing detection logic 312. The mode transition logic 304 also receives an input from a hysteresis comparator 314. The hysteresis comparator 314 is used to make sure that the phase of the voltage regulator switching to the PFM mode of operation does not immediately jump back to the PWM mode of operation responsive to the control voltage from the error amplifier 228 jumping a little bit responsive to transients. The comparator 314 compares the feedback voltage $V_{FB}$ and an inverting input with a reference voltage $V_{REF}$ at its non-inverting input. A transition back to the PWM mode of operation would not be enabled until the feedback voltage drops below a reference voltage, as determined by comparator 314. This reference voltage is not the same as the reference voltage connected to the non-inventing input of the error amplifier, it is 1.5%, 2%, 3%, ect. below this reference voltage depending on the design or application. The mode transition logic 304 also receives a control input from comparator 316. The comparator 316 receives an output from the error amplifier 228 at its non-inverting input and has a threshold voltage $V_{THC}$ applied to its inverting input. The comparator 316 compares the error voltage from the output of the error amplifier 228 with the threshold voltage $V_{THC}$ to determine the point at which the transition to PFM mode of operation from PWM mode of operation is enabled. Thus, when $V_C > V_{THC}$, the circuit transitions from PFM to PWM; when $V_C < V_{THC}$, do nothing, and if zero-crossing condition occurs, transition from PWM to PFM takes place.

As mentioned previously, the multi-phase regulator also includes an error amplifier 228 associated with each phase of the voltage regulator. The non-inverting input is connected to the reference voltage $V_{REF}$, and the inverting input is connected to the feedback voltage $V_{FB}$. The output of each of the error amplifiers 228 are tied together at node 318 for current sharing in the PWM mode of operation. A compensation network is connected to node 318. The compensation network consist of a capacitor 320 connected between node 318 and ground. Connected in parallel with the capacitor 320 are a series connection of a capacitor 322 connected between node 318 and node 324 and a resistor 326 connected between node 324 and ground.

The feedback voltage $V_{FB}$ is applied to the inverting input of the error amplifiers 228 through a voltage divider network 328. The voltage divider network 328 consists of a resistor 330 connected between node 218 and node 332. Node 332 is connected to the inverting inputs of each of the error amplifiers 228. A second resistor 334 is connected between node 332 and ground. A capacitor 336 is connected in parallel with resistor 330 between node 218 and node 332.

The essential challenge to be implemented within a multi-phase DC/DC converter having PFM and PWM modes of operation is the transition from light load conditions to heavy load conditions (PFM mode to PWM mode) and the transition from heavy load conditions to light load conditions (PWM mode to PFM mode). When transitioning from PFM mode to PWM mode within a single phase converter, it is easy to determine the transition point. In one method, when the feedback voltage from the output voltage node drops to a certain percentage of a reference voltage, the modes will change. However, the use of a single parameter is not sufficient within a multi-phase DC/DC converter due to the mismatch between channels. For example, if one channel triggers the feedback voltage drop, the channel will switch to the PWM mode of operation and pull the output voltage back to normal. As the loading is increased, the phase in PWM mode continues to provide current to the loading until it reaches a threshold which is set by $V_{THC}$.

Figure 4:
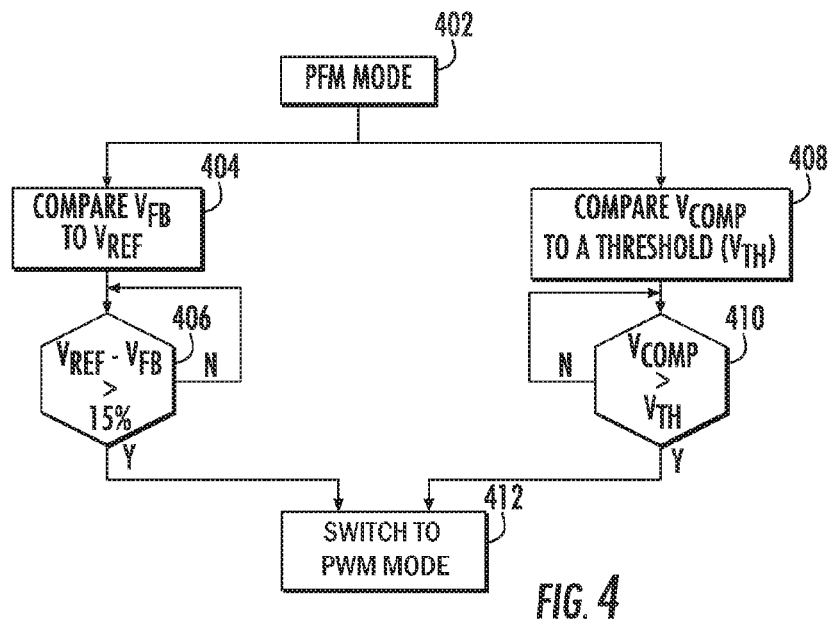
FIG. 4 is a flow diagram describing the operation for switching from a PFM mode of operation to a PWM mode of operation.

The method for PFM mode to PWM mode transition is more fully illustrated with respect to FIG. 4. Initially, at step 402, the circuitry is operating in the PFM (light load) mode of operation. In the PFM mode, the multiplexer 302 is providing the PFM signal to the control logic 214 as described previously. The feedback voltage $V_{FB}$ is compared with a reference voltage $V_{REF}$ at step 404. Inquiry step 406 then determines if the difference between $V_{REF} - V_{FB}$ is greater than 1.5% of the reference voltage $V_{REF}$. If not, inquiry step 406 continues monitoring the difference between the reference voltage and the feedback voltage. At the same time, a comparison is made between the $V_{COMP}$ voltage and the voltage threshold $V_{TH}$ at step 408. Responsive to the comparison, inquiry step 410 determines if the $V_{COMP}$ voltage is greater than the $V_{TH}$ voltage. If not, inquiry step 410 continues monitoring the comparison of $V_{COMP}$ and $V_{TH}$. Once inquiry step 406 determines that the difference between $V_{REF}$ and $V_{FB}$ is greater than 1.5% of $V_{REF}$ or inquiry step 410 determines that $V_{COMP}$ is greater than $V_{TH}$, the circuit is switched to the PWM mode of operation at step 412. The switch from PFM mode to PWM mode occurs when the load 222 is increased.

The offset voltage of the comparator 314 (the one compare $V_{FB}$ and $V_{REF}*(1-1.5\%)$) actually play an important role here, as the Vref is in different phases. Since phases can be in different ICs, they are from different bandgap circuits. Without this offset and the mismatch of $V_{REF}$, all the transitions happen at the same time. However, one phase always transits from PFM to PWM ahead of others, and the $V_{FB}$ regulated immediately to back to $V_{REF}$ as you can see in FIG. 6 below. If there were no other mechanism, this phase sustains all the loading if loading is increasing.

Figure 5:
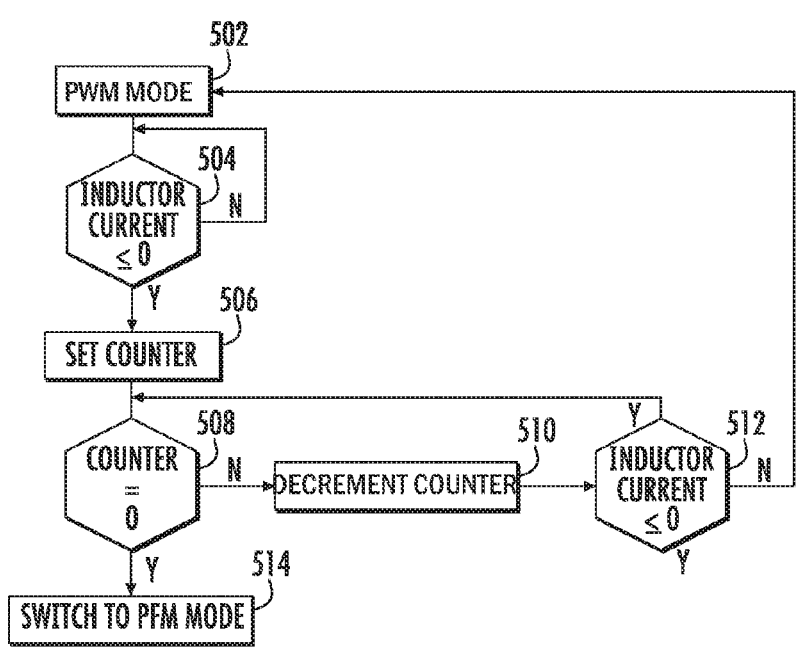
FIG. 5 is a flow diagram describing the operation of switching from the PWM mode of operation to a PFM mode of operation.

Referring now to FIG. 5, there is a flow diagram illustrating the transition from the PWM mode of operation to the PFM mode of operation when the load 222 is decreasing. The circuit is initially operating in the PWM mode at step 502. In this mode transition scheme, the inductor current is utilized to determine when to switch from the PWM mode to the PFM mode. Thus, inquiry step 504 determines when the inductor current is less than or equal to zero. If the current is not less than or equal to zero, inquiry step 504 continues monitoring the inductor current. As the load drops to a certain level, the inductor current will reach a zero value. When the inductor current becomes zero or negative, the efficiency of the circuitry is negatively impacted. Responsive to a zero or negative inductor current, a counter is preset at step 506. Inquiry step 508 determines if the counter is equal to zero. If not, the counter is decreased by one at step 510 and inquiry step 512 determines if the inductor current is less than or equal to zero. If not, control passes back to step 502 and the circuit continues to operate in the PWM mode. If inquiry step 512 determines that the inductor current remains less than or equal to zero, control passes back to inquiry step 508 to determine if the counter is presently zero. Once the counter is decremented to zero, indicating that the converter has remained with a negative inductor current for a predetermined number of switching cycles, the converter will switch to the PFM mode of operation at step 514. Within a multi-phase DC/DC converter when one phase switches from PWM mode to PFM mode, this does not necessarily mean that each of the phases will do the same thing. Other phases will remain in the PWM mode of operation longer as they share more loading. Efficiency is the key thing here. If one phase can sustain the loading, turning on all the other phases in PWM mode causes unnecessary power loss. The hysteresis comparator 314 ensures that the phase switching from PWM mode to PFM mode does not immediately jump back to PWM mode due to the control voltage of the output of the error amplifier experiencing voltage transients.

Figure 6:
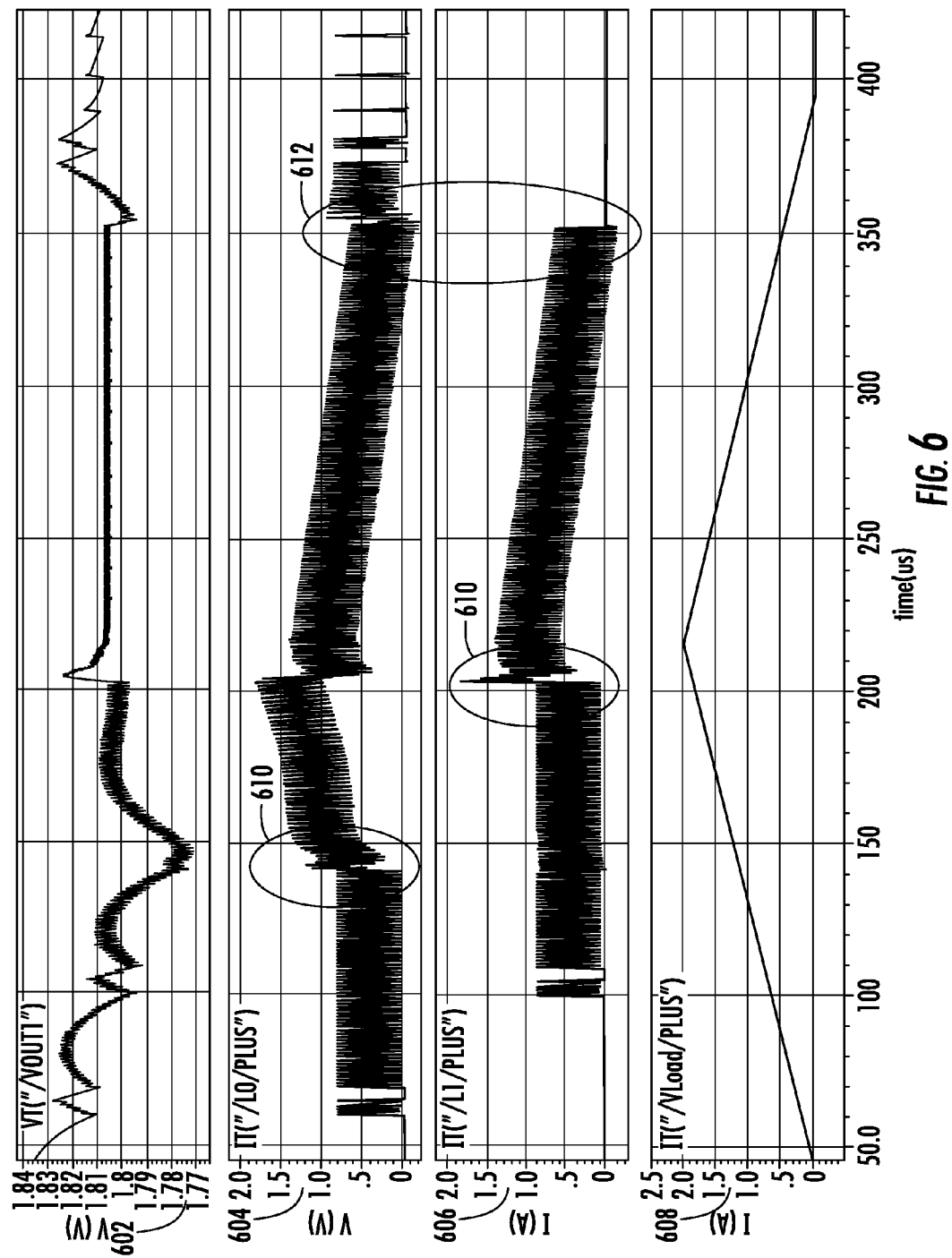
FIG. 6 illustrates the various waveforms showing transition between the PFM and PWM modes of operation.

Referring now to FIG. 6, there are illustrated the various wave forms demonstrating the operation of the PFM and PWM transition with respect to the circuit described in FIG. 3. Waveform 602 represents the output voltage at node 218. The current waveform 604 represents the inductor current at inductor 216 (top). The current waveform 606 represents the inductor current at inductor 216 (bottom). Finally, the current waveform 608 represents the loading current at output load 222. Transition from PFM to PWM mode occurs at point 610. The transition from PWM to PFM mode of operation occurs at point 612 in the diagrams. By introducing a pulse frequency mode of operation within a multi-phase current sharing buck converter at light load conditions the efficiency of the converter is improved and a reduction in power losses is provided while providing a smooth transition between the PFM and PWM modes of operation. The proposed design provides extremely low power losses within light loading transitions and the transition to PWM mode and current sharing automatically as the load increases improves overall circuit operation. No dedicated pin is required for intercommunication between the channels.

It will be appreciated by those skilled in the art having the benefit of this disclosure that this system and method for PFM/PWM mode transition within a multi-phase buck converter provides improved heavy and light load operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multiphase voltage regulator, comprising:
   a plurality of DC/DC voltage regulators, each of the DC/DC voltage regulators associated with a phase of the multiphase voltage regulator, each of the plurality of DC/DC voltage regulators, comprising:
      a first switching transistor connected between an input voltage node and a phase node responsive to switching control signals;
      a second switching transistor connected between the phase node and a ground node responsive to the switching control signals;
      an inductor connected between the phase node and an output voltage node;
      control logic for generating the switching control signals responsive to a pulse control signal;
      PFM/PWM transition logic for generating the pulse control signal, wherein the pulse control signal transitions between a PWM signal and a PFM signal responsive to an error voltage, a feedback voltage from the output voltage node and an inductor current through the inductor; and
      an error amplifier for generating the error voltage responsive to the feedback voltage and a reference voltage, wherein the output of each error amplifier in each of the plurality of phases are connected to each other.

2. The multiphase voltage regulator of claim 1, wherein the PFM/PWM transition logic further comprises:
   first control logic for generating each of the PWM signal and the PFM signal and selecting one of the PWM signal and the PFM signal responsive to a mode select signal; and
   mode selection logic for generating the mode select signal responsive to the error voltage, the feedback voltage and the inductor current.

3. The multiphase voltage regulator of claim 2, wherein the first control logic further comprises:
   a PWM comparator for generating the PWM signal responsive to a comparison of the error voltage with a sum of the inductor current and a slope current;
   a PFM comparator for generating the PFM signal responsive to a comparison of the inductor current with a peak value;
   a multiplexer connected to receive the PWM signal and the PFM signal and for outputting one of the PWM signal and the PFM signal as the pulse control signal responsive to the mode select signal.

4. The multiphase voltage regulator of claim 2, wherein the mode selection logic further comprises:
   a zero crossing detector for detecting when the inductor current falls below zero and generating a zero detect signal responsive thereto;
   a hysteresis comparator for generating a hysteresis signal controlling when the pulse control signal transitions from the PFM signal to the PWM signal;
   a transition comparator for determining when to switch between the PFM signal and the PWM signal responsive to a comparison of the error voltage and a transition threshold level; and
   control logic for generating the mode select signal responsive to the output of the zero detect signal, the hysteresis signal and the output of the transition comparator.

5. The multiphase voltage regulator of claim 4, wherein the control logic generates the mode select signal to transition from the PFM signal to the PWM signal responsive to the error voltage exceeding the transition threshold level.

6. The multiphase voltage regulator of claim 5, wherein the transition from the PFM signal to the PWM signal is further responsive to a feedback voltage falling below a second reference voltage.

7. The multiphase voltage regulator of claim 4, wherein the control logic generates the mode select signal to transition from the PWM signal to the PFM signal responsive to the inductor current falling below zero.

8. A multiphase voltage regulator, comprising:
   a plurality of DC/DC voltage regulators, each of the DC/DC voltage regulators associated with a phase of the multiphase voltage regulator, each of the plurality of DC/DC voltage regulators, comprising:
      a first switching transistor connected between an input voltage node and a phase node responsive to a switching control signals;
      a second switching transistor connected between the phase node and a ground node responsive to the switching control signals;
      an inductor connected between the phase node and an output voltage node;
      control logic for generating the switching control signals responsive to a pulse control signal;
      a PWM comparator for generating a PWM signal responsive to a comparison of an error voltage with a sum of an inductor current through the inductor and a slope current;
      a PFM comparator for generating a PFM signal responsive to a comparison of the inductor current with a peak value;
      a multiplexer connected to receive the PWM signal and the PFM signal and for outputting one of the PWM signal and the PFM signal as a pulse control signal responsive to a mode select signal;
      a zero crossing detector for detecting when the inductor current falls below zero and generating a zero detect signal responsive thereto;
      a hysteresis comparator for generating a hysteresis signal controlling when the pulse control signal transitions from the PFM signal to the PWM signal;
      a transition comparator for determining when to switch between the PFM signal and the PWM signal responsive to a comparison of the error voltage and a transition threshold level;
      control logic for generating the mode select signal responsive to the output of the zero detect signal, the hysteresis signal and the output of the transition comparator; and
      an error amplifier for generating the error voltage responsive to the feedback voltage and a reference voltage, wherein the output of each error amplifier in each of the plurality of phases are connected to each other.

9. The multiphase voltage regulator of claim 8, wherein the control logic generates the mode select signal to transition from the PFM signal to the PWM signal responsive to the error voltage exceeding the transition threshold level.

10. The multiphase voltage regulator of claim 9, wherein the transition from the PFM signal to the PWM signal is further responsive to a feedback voltage falling below a second reference voltage.

11. The multiphase voltage regulator of claim 8, wherein the control logic generates the mode select signal to transition from the PWM signal to the PFM signal responsive to the inductor current falling below zero.

12. A method for operating a multiphase voltage regulator, comprising the steps of:
   generating a regulated output voltage responsive to an input voltage and switching control signals;
   generating the switching control signals responsive to a pulse control signal, wherein the pulse control signal comprises either a PWM signal or a PFM signal;
   transitioning between the PWM signal and the PFM signal responsive to an error voltage, a feedback voltage from the output voltage node and an inductor current through an inductor;
   generating the error voltage responsive to the feedback voltage and a reference voltage.

13. The method of claim 12 further including the step of connecting an error voltage generated in each phase of the multiphase regulator to a same node.

14. The method of claim 12, wherein the step of transitioning further comprises the steps of:
   generating each of the PWM signal and the PFM signal;
   generating a mode select signal responsive to the error voltage, the feedback voltage and the inductor current; and
   selecting one of the PWM signal and the PFM signal responsive to the mode select signal.

15. The method of claim 14, wherein the step of generating each of the PWM signal and the PFM signal further comprises the steps of:
   generating the PWM signal responsive to a comparison of the error voltage with a sum of the inductor current and a slope current;
   generating the PFM signal responsive to a comparison of the inductor current with a peak value; and
   multiplexing between the PWM signal and the PFM signal as the pulse control signal responsive to the mode select signal.

16. The method of claim 14, wherein the step of generating the mode select signal further comprises the steps of:
   detecting when the inductor current falls below zero;
   generating a zero detect signal responsive to the inductor current falling below zero;
   generating a hysteresis signal controlling when the pulse control signal transitions from the PFM signal to the PWM signal;
   determining when to switch between the PFM signal and the PWM signal responsive to a comparison of the error voltage and a transition threshold level; and generating the mode select signal responsive to the output of the zero detect signal, the hysteresis signal and results of the comparison between the error voltage and the transition threshold level.

17. The method of claim 16, wherein the step of generating the mode select signal further comprises the step of transitioning from the PFM signal to the PWM signal responsive to the error voltage exceeding the transition threshold level.

18. The method of claim 17, wherein the step of generating the mode select signal further comprises the step of transitioning from the PFM signal to the PWM signal responsive to a feedback voltage falling below a second reference voltage.

19. The method of claim 16, wherein the step of generating the mode select signal further comprises the step of transitioning from the PWM signal to the PFM signal responsive to the inductor current falling below zero for a predetermined period of time.

* * * * *